United States Patent [19]

Reinker

[11] Patent Number: 5,745,631
[45] Date of Patent: Apr. 28, 1998

[54] SELF-ALIGNING OPTICAL BEAM SYSTEM

[75] Inventor: David M. Reinker, Yorba Linda, Calif.

[73] Assignee: Irvine Sensors Corporation, Costa Mesa, Calif.

[21] Appl. No.: 592,691

[22] Filed: Jan. 26, 1996

[51] Int. Cl.$^6$ ............................................. G02B 6/10
[52] U.S. Cl. ............................................. 385/132
[58] Field of Search ........................ 385/96, 98, 49, 385/50, 18, 88, 89; 250/491.1, 492.2; 369/44.33, 44.26, 44.34; 356/356, 363, 401

[56] References Cited

U.S. PATENT DOCUMENTS

| | | | |
|---|---|---|---|
| 4,564,260 | 1/1986 | Dirmeyer et al. | 385/44 |
| 4,589,724 | 5/1986 | Winzer | 385/47 |
| 5,054,873 | 10/1991 | Davis et al. | 385/27 |
| 5,098,804 | 3/1992 | Booth | 385/16 X |
| 5,136,671 | 8/1992 | Dragone | 385/17 |
| 5,333,225 | 7/1994 | Jacobowitz et al. | 385/93 |

*Primary Examiner*—Akm E. Ullah
*Attorney, Agent, or Firm*—Thomas J. Plante

[57] ABSTRACT

A self-aligning optical beam system is disclosed in which optical alignment of two beam-carrying portions, such as a laser beam generated by a chip, and a light guide formed as a waveguide in a polymeric material, is precisely controlled by plug-and-socket connection between a substrate and a chip. Plugs in the form of solder bumps are formed on one surface of a laser chip, and are inserted in sockets provided in a substrate. The optical alignment is precisely controlled in three axes, two of which guarantee alignment for laser beam transmission into a waveguide, and one of which minimizes the gap across which the beam travels.

A powerful waveguide division multiplexer may be provided by having numerous converging waveguides on a single substrate, and by stacking a number of substrates, all of whose waveguides feed into a single optical output channel.

13 Claims, 5 Drawing Sheets

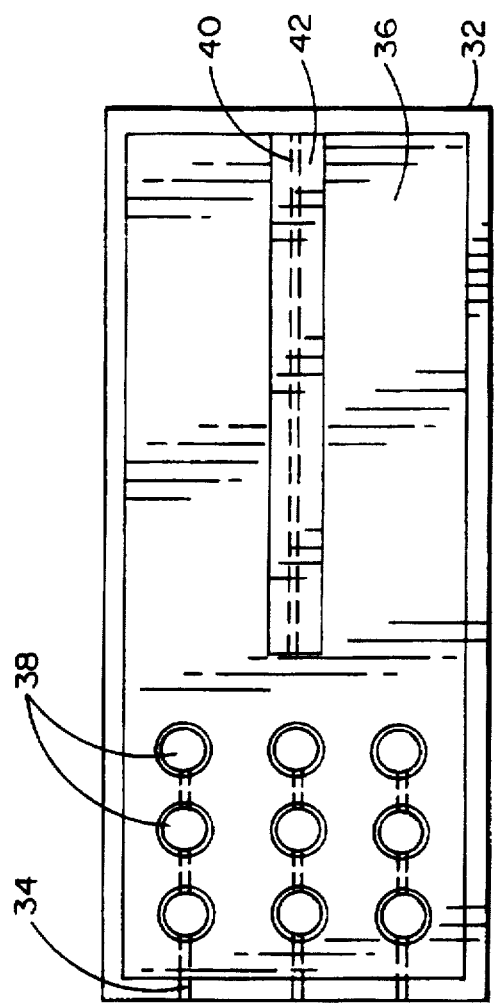
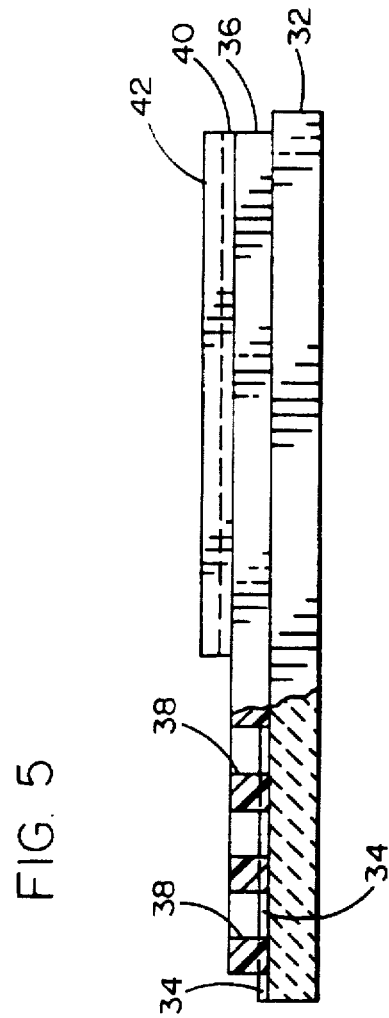
FIG. 5
FIG. 6
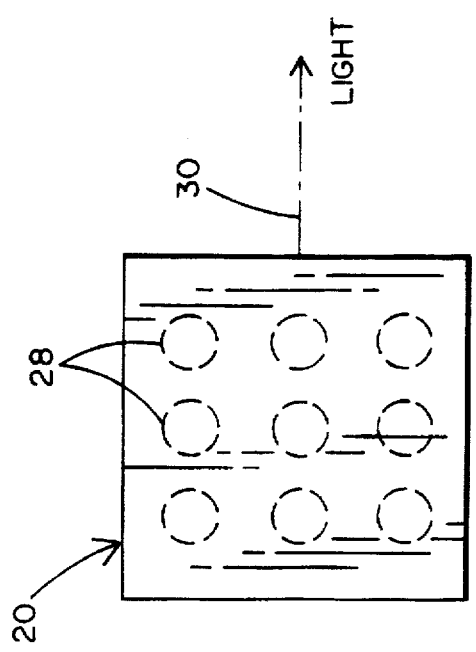
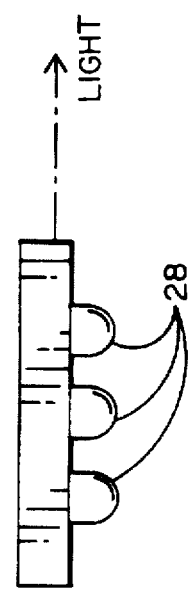
FIG. 3
FIG. 4

5,745,631

SELF-ALIGNING OPTICAL BEAM SYSTEM

BACKGROUND OF THE INVENTION

This invention relates to optical beam transmission for use in information transfer systems, particularly where an optical beam source, such as a laser, needs to be accurately aligned with an optical beam channel, such as a waveguide.

Opto-electronic integration is the technology which combines electronic and optical functions in a way that will obtain the best performance for the lowest cost. The range of techniques spans from a purely hybrid approach, to flip chip bonding, to heteroepitaxy (dissimilar material growth), and finally to purely monolithic integration. The large scale monolithic opto-electronic integrated circuit (OEIC) is not feasible at this time because of the variety of materials and processes required for fabrication. The current need is to provide an efficient manufacturing process for a hybrid opto-electronic system. Such a system may, for example, provide a waveguide layout which routes a large number of parallel waveguide (light guide) input channels into a single waveguide output channel. The incoming optical signals can be multiplexed onto a single output channel by using wavelength separation to provide independent output signals.

A multi-waveguide multiplexing structure may be provided by a polyimide (or other material) layer in which waveguides have been formed by means of photo-lithographic processing. The layer is designed to provide optical paths (light guides) similar to those in optically transmitting fibers, i.e., light is carried by a core material inside a cladding material which reflects light back into the core material.

Optical beams directed into the channels of a waveguide may be provided by laser generating chips. A separate laser chip may be connected to a separate waveguide channel, with highly precise alignment of the laser output beam and its waveguide channel.

Flip-chip integration is a preferred means of combining opto-electronic functions. In a publication titled "Integrated Optoelectronics" (Academic Press, 1994), authors Dungenais, Leheny and Crow described experiments relating to optoelectronic combinations in a chapter on "Many Simultaneous OEIC Chip Connections, Both Electrical and Optical". They referred to "flip-chip, solder bump technology ** used to self-align O-E devices to the chip carrier".

Heretofore, alignment of each laser beam to its waveguide channel has relied on labor intensive techniques. One technique has been manual adjustment guided by visual alignment, using a microscope. Another technique has been manual adjustment using lateral movement to locate the particular alignment in which the highest amount of light transmission is registered by an intensity meter. Both of these techniques may be referred to as active alignment, because they require extensive manual adjustment.

A goal of the present invention is to provide passive, i.e., automatic, alignment of the optical beam path. This ensures precise alignment at a substantially lower manufacturing cost.

SUMMARY OF THE INVENTION

In the present invention, semiconductor edge-emitting lasers are passively aligned to polymeric waveguides. The alignment technique uses a bump-and-socket method in which bumps on one of the members enter into sockets on the other member, thereby precisely controlling two axes, due to the "locking in" effect. Precision in the third axis is obtained by carefully controlling the size of each bump. Precision in a first axis assures horizontal alignment of the laser beam and waveguide. Precision in a second axis assures vertical alignment of the laser beam and weveguide. Precision in a third axis minimizes the gap between the laser and the aligned waveguide.

As in common assignee U.S. Pat. No. 5,406,701, issued Apr. 18, 1995, the guide bumps may be formed of solder material, and small aligned solder bumps may be formed at the bottom of each socket. After alignment of the members, the solder material is caused to flow, thereby structurally connecting the two members. Precision in the first two axes is enhanced by the effect of surface tension of the reflowed solder bumps; i.e., during the reflow process the solder material tends to pull itself into a shape which minimizes surface energy. The term "solder" includes any electrically conductive material which reflows when heated.

The solder bumps have the synergistic benefit of conducting electrical current into the laser chip in order to generate the laser beam. As in the case of U.S. Pat. No. 5,406,701, the solder bump to socket connections provide both mechanical connection and electrical connection, in addition to precision alignment.

As stated above, a multi waveguide multiplexing structure is a very useful embodiment of the present invention. This concept may be enhanced by stacking multiple layers of the waveguide/laser substrates, thus multiplying the number of wavelengths accommodated by the multiplexer.

BRIEF DESCRIPTION OF THE DRAWINGS

FIGS. 3 and 4 show top and side views, respectively, of an individual laser diode chip;

FIGS. 5 and 6 show top and side views, respectively, of a portion of the pre-formed waveguide substrate;

DETAILED DESCRIPTION OF SPECIFIC STRUCTURES

Figure 1:
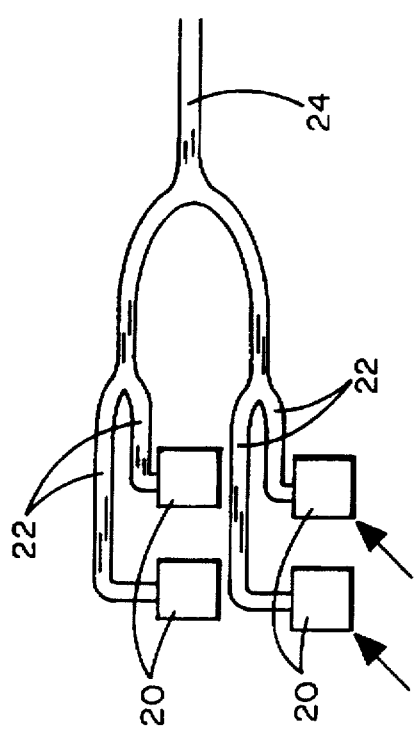
FIG. 1 is a plan view of a small portion of a laser/waveguide combination.

FIG. 1 provides a highly simplified illustration of one possible environment for use of the present invention. A plurality of separate laser chips 20 are shown, each emitting its laser beam into a separate waveguide 22. The waveguides 22 are shown converging into a multiplexer waveguide 24.

Figure 2:
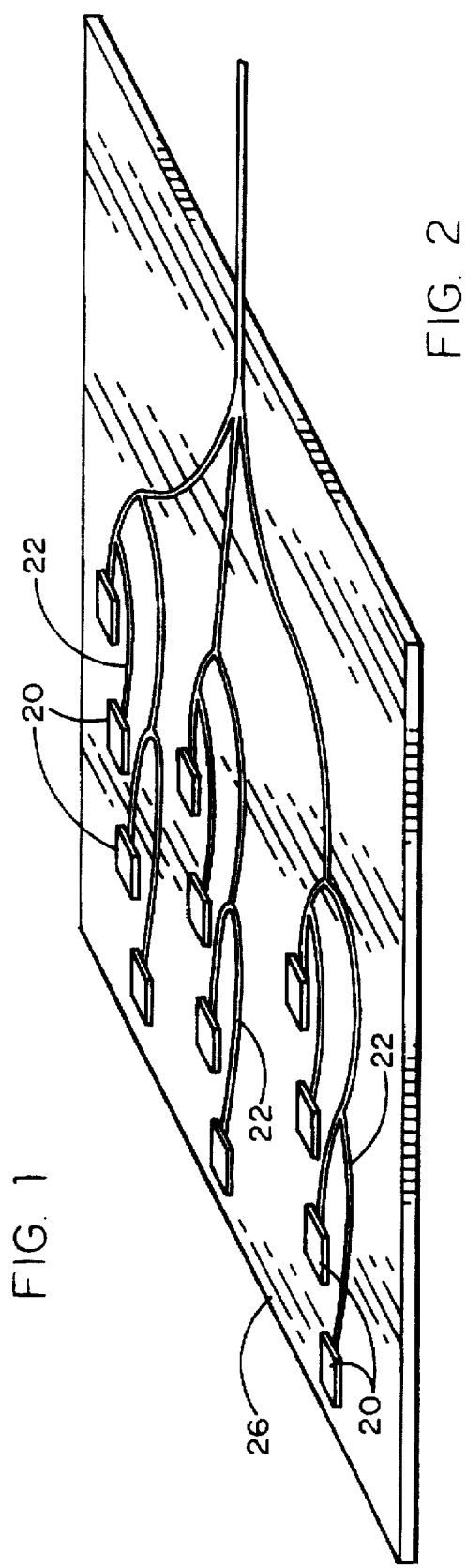
FIG. 2 is an isometric view showing a substrate having a plurality of integral waveguide channels and an equal number of laser chips mounted on the substrate.

FIG. 2 shows a substrate 26, on which a plurality of laser chips 20 are mounted aligned with a plurality of preformed waveguides 22. The optical beams travel in a horizontal plane from edge-emitting lasers into waveguides, which are formed above the main surface of substrate 26.

FIGS. 3 and 4 show top and side views, respectively, of an individual laser diode chip 20. The chip has a plurality of solder bumps 28 formed on its lower flat surface. The chip, using electrical current flowing in its p-n junction, generates a laser beam 30, which is emitted from the side of the chip. A suitable chip material is gallium arsenide (GaAs). The chip has been "flipped" over, after the p-n function was formed near its top surface, and after the solder bumps were formed on its top surface.

FIGS. 5 and 6 show top and side views, respectively, of a portion of a pre-formed waveguide substrate. The actual waveguide substrate would include multiple optical channels, but the portion shown accommodates a single laser chip, one of many which would normally be mounted on a single substrate having an equal number of waveguide channels, which may converge into a single channel, thereby providing a wavelength division multiplexer (WDM).

As seen best in FIG. 6, the substrate 26 is multi-layered. The bottom layer 32 provides mechanical support and electrical signal routing. Supporting layer 32 is formed of material which has high thermal conductivity combined with electrical insulation efficiency. An ideal material is CVD diamond, which is relatively expensive. A less expensive, but less thermally conductive, material is aluminum nitride. The sensitivity of laser emission wavelength to temperature creates the need for efficient heat sinking. Electrical energy is routed to the laser chips. This is accomplished by metal traces 34 carried on the upper surface of supporting layer 32.

Above supporting layer 32, a socket-providing dielectric layer 36 is formed, preferably using polymeric material, which can be spun on the top of layer 32. The preferred material is polyimide, which is deposited in three distinct polyimide layers. The first polyimide layer 36 forms alignment sockets 38 adapted to receive the solder bumps 28 formed on the laser chip; and it also provides undercladding for waveguides 40, which are formed in the polyimide. The second layer of deposited polyimide contains the waveguides 40, which are formed by photolithographic processing. The third (top) layer 42 of polyimide provides the overcladding for the waveguides.

The cladding polyimide material above and below the light guide channel has a lower index of refraction than the core polyimide material which provides the channel. The cladding provides a protective coating and also protects the circuit from light scattering caused by dust on the waveguides. If necessary, the entire surface is coated with teflon for moisture and mechanical protection. Approximately 1 dB/cm propagation loss is considered to be acceptable for waveguiding in an OEIC. Losses are due mostly to intrinsic absorption and to surface corrugation scattering. Therefore, smooth walls (<0.1 μm roughness) are imperative for low losses. Photographs reveal smooth walls of the polyimide created by the wet development process. Polyimide is desirable over other conventional polymeric lightguide materials because it is stable at high temperatures. A formulation designed specifically for optical transmission is commercially available from Amoco Chemical Co. Amoco is introducing a photodefinable matched index core/cladding pair of materials for single mode applications. The higher index core material is called Ultradel 9120D and the lower index cladding is Ultradel 9020D. Absorption losses in the core have been measured at 0.1–0.3 dB/cm depending on the wavelength of the light. The polyimide has been highly fluorinated to reduce absorption losses.

Figure 7:
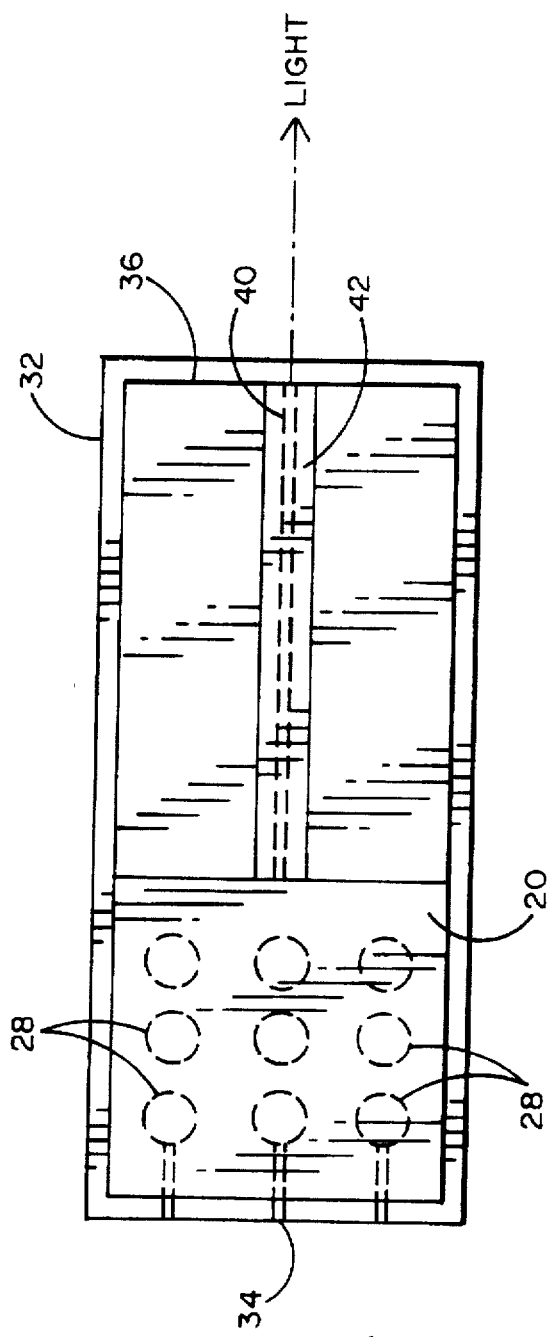
FIGS. 7 and 8 show top and side views, respectively, of the assembled substrate and chip combination.
Figure 8:
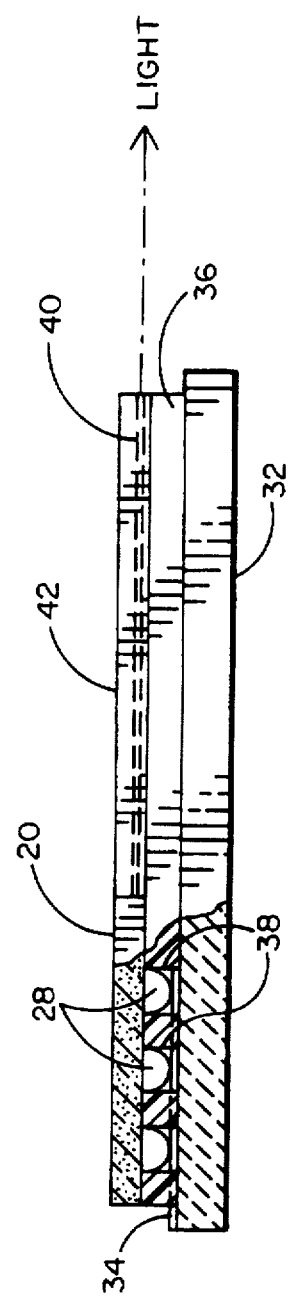

FIGS. 7 and 8 show top and side views, respectively, of the assembled substrate and chip combination. The solder bumps 28 on the laser chip 20 extend into their aligned sockets 38 in the polyimide layer 36. Two of the solder bumps are joined to metallic traces 34 in order to conduct electrical current through the laser chip laser-generating circuitry. All of the solder bumps 28 on laser chip 20 (nine are shown) are used to conduct heat from the laser chip into the supporting heat sink, layer 32.

In the present invention, the most important function of the bumps-in-sockets alignment is the ability to accurately align the optical interconnection between the laser beam and the light guide. The mating of the bumps and sockets brings the beam from the laser chip automatically into high precision alignment with its pre-existing waveguide. Mechanical registration to the waveguide is within a few μm, which is adequate for multi-mode operation. If single mode operation is required, surface tension of the molten solder and the attractive forces of wetting bring the device into high precision alignment. Since accuracy is determined by the imaging system used for fabrication, sub-micron tolerances are possible. Laser-to-waveguide coupling can be thought of as a subset of waveguide-to-waveguide coupling. Calculation of the coupling coefficient between two rectangular waveguides requires exact knowledge of the waveguide parameters, such as dimensions, refractive indices, separation, etc. Most of the light from a laser operating in the fundamental mode will couple into the lowest order mode of the waveguide, if the dimensions are similar and the alignment is accurate. As an example, the coupling efficiency is 81% for a laser and waveguide with indices of 3.6 and 1.6, respectively, equal thicknesses, and a separation of less than 0.25 μm. The near field modal pattern of the edge emitting laser is elliptical, with the long axis in the plane of the p-n junction (i.e., horizontal in the drawing). Coupled glass fiber ends are typically polished into a matching quadrangular pyramidal shape. Polyimide strip type waveguides, on the other hand, are inherently rectangular-shaped, which provides efficient coupling to the laser's elliptical near field pattern.

As best seen in FIG. 8, the waveguide 40 is located at the same elevation as the laser beam 30 (FIGS. 3 and 4) emitted by the side-emitting laser chip 20. The alignment of the laser beam with the waveguide, and the edge gap between the laser and the waveguide are controlled by the combination of bumps 28 with sockets 38. A minimum of two bump-in-socket alignments are needed to accurately position the laser with respect to the lightguide. Increasing the number of bump-in-socket alignments increases the positioning accuracy in the two horizontal axes. As stated, surface tension of the reflowed solder increases the alignment accuracy.

The amount of solder material in each socket can be controlled with sufficient accuracy to align the laser with the lightguide in the vertical axis. Both the diameter and the height of the solder bumps can be precisely controlled. The diameter of each bump can be controlled to sub-micron accuracy by the use of photolithographic processing, i.e., using photoresist and photomasks to image the bump diameter. The height of each bump is very accurately controlled by using a thickness monitor, a device located inside the evaporation chamber. As solder is evaporated and deposited on the surface, the thickness monitor shows exactly how much material has been deposited, permitting the operator to control bump height to sub-micron accuracy.

As stated above, the optical alignment based on the bump-and-socket structure requires a high degree of precision in the manufacturing process. An advantage of the present invention is the fact that the expensive active devices are bonded to the assembly after defective substrates have been rejected. The additional benefits of the bump-to-socket connection (as in U.S. Pat. No. 5,406,701) remain in the structure, i.e., the external electrical connections to the laser diode, and the conduction of heat into the supporting layer.

Although defective substrates may be rejected, the waveguide channels must be very accurately located during the manufacturing process. If we refer to the polyimide layers as lying on a horizontal plane, the two axes in that plane are precisely controlled by the photolithographic processes used in creating the waveguide channels. The third dimension, which may be referred to as the vertical axis, can be precisely controlled during the depositing process, in which liquid material is spun onto the substrate. Precise thickness is attained by control of viscosity, spin speed, and curing temperature.

In the structure of U.S. Pat. No. 5,406,701, the only alignment involved is the solder bumps alignment with the terminal pads at the bottom of the sockets. The movement into alignment is in a horizontal plane. In the present structure, the plane of optical alignment is at right angles to the direction of engagement of the bumps and sockets. This permits the optical beam to follow a horizontal path above the plane of engagement of the bumps and sockets, thus providing a relatively simple and compact structural arrangement.

The self-aligning of optical beams and channels can have many valuable uses. The insertion of laser chips in a waveguide multiplexer is, of course, a very attractive use. The waveguide multiplexing effect can be multiplied by stacking a plurality of laser-carrying substrates, such as the substrate shown in FIG. 2.

Figure 10:
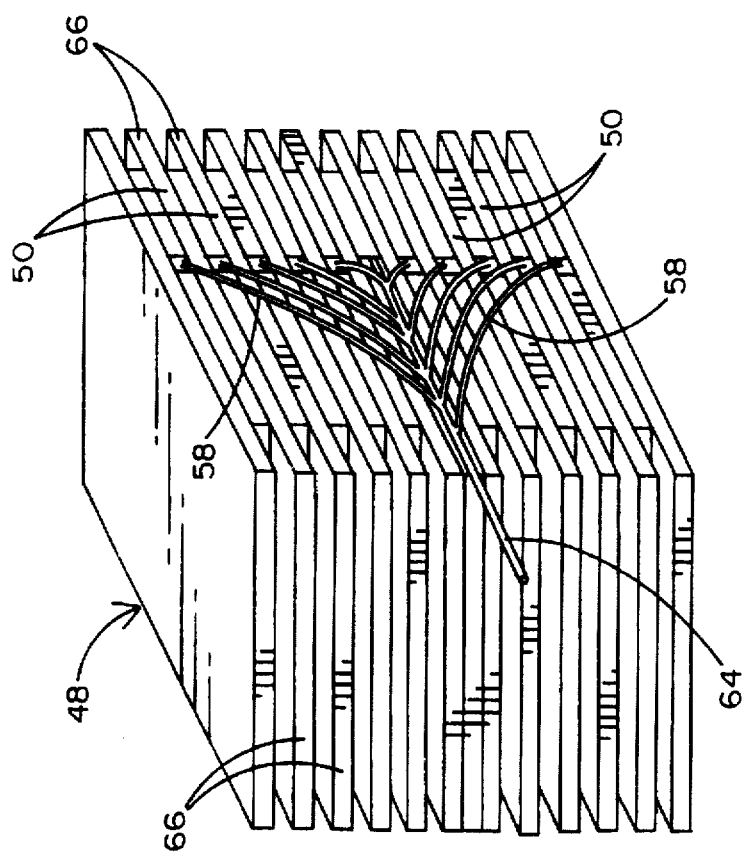
FIGS. 9 and 10 are isometric views showing opposite sides of a stacked array of waveguide substrates, each providing a multiplicity of waveguide multiplexer channels, which are then combined as a single channel from the stacked array.
Figure 9:
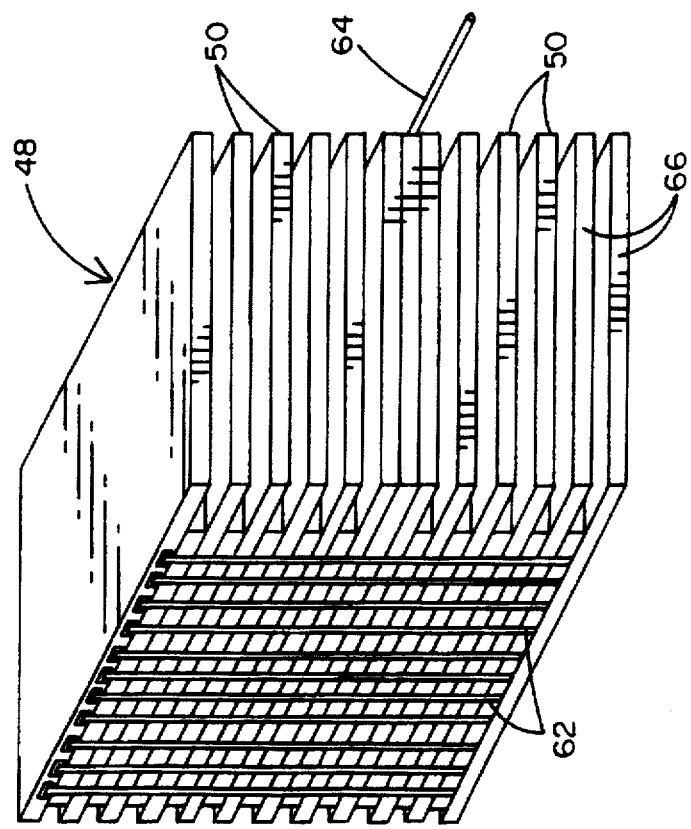
Figure 11:
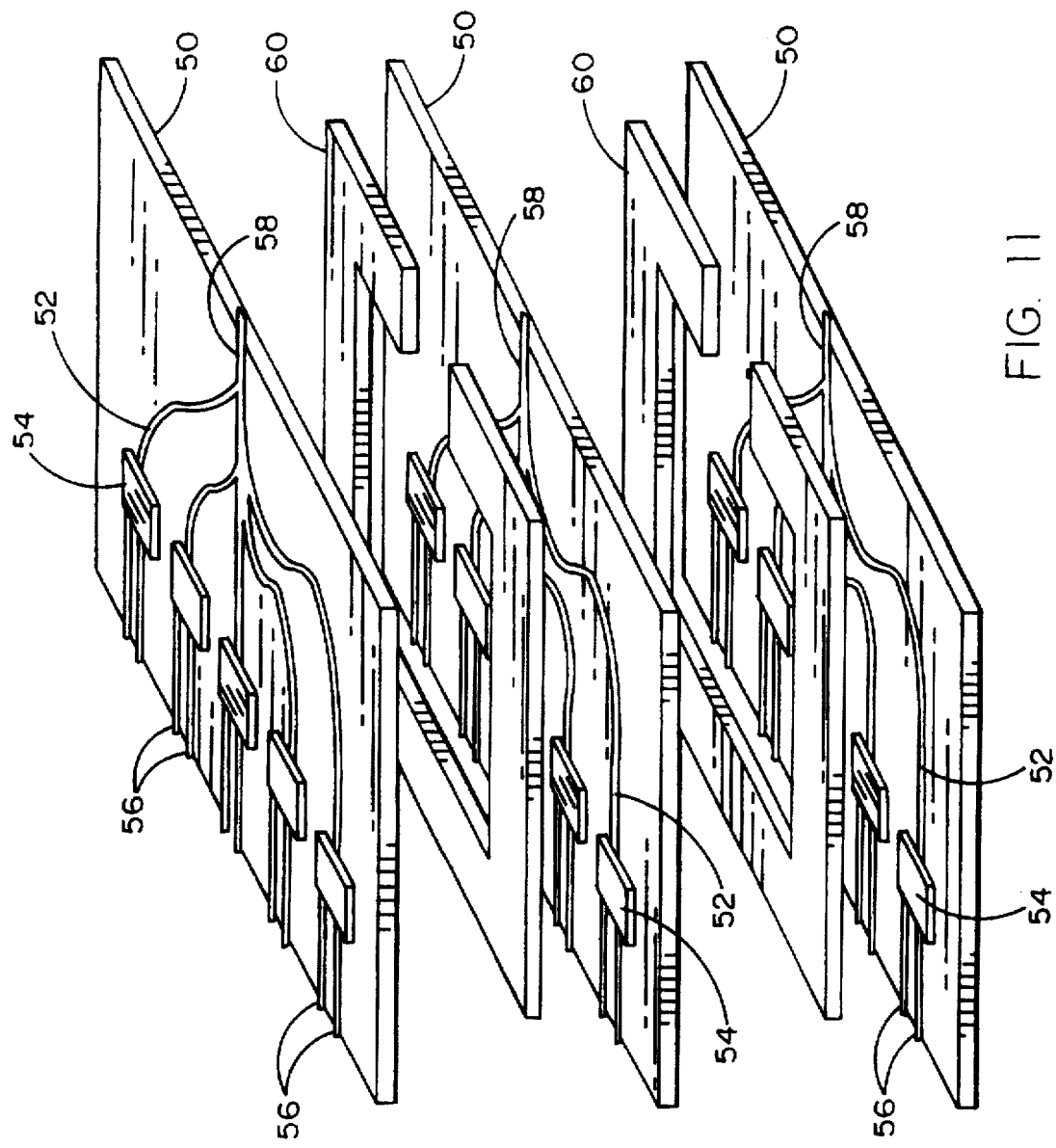
FIG. 11 is an isometric, exploded view showing substrates and spacers of the type incorporated in FIGS. 9 and 10.

FIGS. 9–11 show a 3D array 48 of waveguide substrates. As an example, FIGS. 9 and 10 show a stack of ten populated substrates 50. As seen in FIG. 11, each substrate 50 contains a number of waveguide channels 52, and supports an equal number of laser chips 54. Each laser chip in FIG. 11 is reached by two electrical lines 56, which conduct the laser-generating electrical current. Waveguide multiplexing provides one exiting optical channel 58 on each substrate 50.

Using a C-shaped layer spacer 60 between each pair of adjacent substrates permits formation of the integrated array structure of FIGS. 9 and 10. As seen in FIG. 9, bus line conductors 62 provide electrical access on the backplane of the stacked array 48. FIG. 10 shows the emitting plane of the stacked array 48. The exiting optical multiplexed channels 58 from the ten active layers 50 are multiplexed into a single optical output channel 64 carrying signals from the entire array.

A module of this configuration could contain hundreds of lasers within a 13 mm×5 mm×5 mm (0.5"×0.2"×0.2") cube. Heat can be conducted out through diamond substrates, which can have cooling fins 66 at the sides of the stack. This strategy for thermal management is not possible in a surface emitting array. Since laser diodes require only two electrical terminals for operation, each individual device of the two-dimensional array can be modulated separately by routing traces from the back edge of the substrate. The layer substrates and interlayer spacers electrically isolate the active devices and layers from each other. Each layer of the stack may contain 40 lasers in a 2D array. The total substrate area may be approximately 13 mm×5 mm. The stack consists of 10 populated substrates, plus 1 cap layer, separated by 10 window-frame spacers. The substrates are 0.3 mm thick and the spacers are 0.15 mm, resulting in a total height of 5 mm. The entire module with 400 lasers of 10 mW each would emit a total of 1.0 W, even if the coupling efficiency is only 25%.

Output from each device is coupled into a single mode polyimide waveguide and directed to the optical mixer through turning mirrors and gradual bends. All waveguides on each layer converge, forming a single guide. Upon layer stacking, these waveguides form a linear array on the cube emitting plane. Optical mixing continues on the emitting plane surface, again utilizing 90° turns and gradual bends. Final coupling into an optical fiber may be accomplished by inserting the fiber into an alignment slot created in photodefinable polyimide. The fiber core diameter and the waveguide cross-section should be of approximately the same area for the lowest coupling loss.

A 3D array of lasers, with each operating at 2.5 Gbit/s, may be combined to form a 1.0 Terabit/s wavelength division multiplexer (WDM). Preliminary designs envision 400 laser diodes of varying wavelength which are multiplexed by the converging waveguides. The laser diode materials can be varied to shift the wavelengths in 1 nm increments. Wavelength drift caused by temperature fluctuations in the diodes is a serious problem for WDM. Addition of feedback to compensate for the drifting makes the system much more expensive. Therefore, the ability of 3D architecture to draw heat out of the chips is very important. The peak wavelength drift of a common 1.3 µm InGaAsP Distributed Feedback (DFB) laser is approximately 0.1 nm/° C.[5]. AlGaAs edge emitting lasers at 0.85 µm exhibit wavelength shifts of 0.22–0.37 nm/° C.[6]. In order to allow for 400 lasers in the range between 1100 nm and 1500 nm, they must be separated by 1 nm. Temperature must then be controlled to less than ±5° C. for prevention of wavelength drift into the spectral region of an adjacent DFB laser.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. An optical beam alignment structure comprising:
   a substantially flat substrate having formed in a portion thereof a plurality of optical channels extending in a plane parallel to the plane of the substrate, and having a plurality of sockets formed in a different portion of the substrate extending partially through the substrate; and
   a plurality of laser chips supported by the substrate, each adapted to emit a laser beam into one of the optical channels, and each having formed thereon a plurality of plugs adapted to extend into aligned sockets of the substrate when the laser chip is in position on the substrate;
   the plugs extending into their respective sockets in a direction at an angle from the plane of the substrate, so that the plugs inside the sockets prevent motion of the laser chips relative to the substrate in the plane of the substrate.

2. The structure of claim 1 in which the plugs on the chips, and the sockets in the substrate combine to precisely locate the chip and substrate relative to one another.

3. The structure of claim 2 in which the fit of the plugs in the sockets provides precise relative location of the chip and substrate in the two horizontal axes, and the amount of socket material provides precise relative location of the chip and substrate in the vertical axis.

4. The structure of claim 1 in which the substrate comprises polymeric material having a plurality of waveguides formed therein to provide the optical channels, each of which receives a laser beam.

5. The structure of claim 4 in which precise location of the waveguides in the substrate is insured by a photolithographic process which precisely locates the waveguides in the two horizontal axes, and by a process for depositing the polymeric material to a precisely controlled depth.

6. The structure of claim 5 in which the polymeric material is polyimide, and the waveguides each have a polyimide core material, and a polyimide cladding material, the cladding having a lower index of refraction than the core, so that the cladding reflects light back into the core.

7. The structure of claim 1 in which electric terminals are provided at the bottom of a plurality of substrate sockets, so that the plugs in the sockets contact the terminals to connect electrical power to the laser-generating chips.

8. The structure of claim 1 in which the substrate has a bottom supporting plane formed of material which is electrically insulating, but is an efficient thermal conductor.

9. The structure of claim 8 in which the bottom substrate layer supports metal traces which provide electrical leads at the bottoms of a plurality of the sockets in the substrate.

10. A method of forming a precise optical alignment system which comprises:

forming a generally planar substrate which has a plurality of layers, including a polymer layer which provides a plurality of optical channels and also provides a plurality of sockets extending at right angles down from the surface of the polymer;

forming a plurality of separate laser-generating chips each having plugs formed thereon adapted to fit into the sockets, and each having a side-emitting laser beam adapted to align with one of the optical channels provided by the substrate; and mounting the chips on the substrate with their plugs extending into the sockets formed in the substrate in such a way as to prevent motion of the chips relative to the substrate in the plane of the substrate, and with their laser beams respectively aligned with the optical channels provided in the polymer layer.

11. A wavelength division multiplexer for optical signals, comprising a plurality of layers joined in a multi-layer structure, each layer comprising:

a substrate having polymer material with a plurality of optical waveguides formed therein;

a plurality of light generating laser sources mounted on the substrate layer, each adapted to emit a laser beam into one of the optical waveguides on that layer;

shaped waveguide channels which cause the optical waveguides to converge into a single multiplexer channel on each layer; and shaped waveguide channels which cause the multiplexer channels from each layer to converge into a single multiplexer channel for the multi-layer structure.

12. The method of claim 10 in which alignment of the plugs includes:

locking in of the plugs in their respective sockets to provide initial location; and more precise alignment thereafter as a result of reflowing of the plug material and the effect of surface tension during such reflowing.

13. The method of claim 10 in which the sockets are formed in the same material as the waveguides.

* * * * *